United States Patent [19]

Jäger

[11] 4,061,838

[45] Dec. 6, 1977

[54] APPARATUS FOR CONTROLLING THE ELECTROLYTE CONCENTRATION OF FUEL CELL BATTERIES

[75] Inventor: Philipp Jäger, Erlangen, Germany

[73] Assignee: Siemens Aktiengesellschaft, Munich, Germany

[21] Appl. No.: 675,967

[22] Filed: Apr. 12, 1976

[30] Foreign Application Priority Data

Apr. 29, 1975 Germany .............................. 2519098

[51] Int. Cl.$^2$ ............................................. H01M 8/08
[52] U.S. Cl. ................................................... 429/22
[58] Field of Search .................... 429/12, 13, 14, 22, 429/25, 26

[56] References Cited

U.S. PATENT DOCUMENTS 3,244,564  4/1966  Fox ........................................ 429/22
3,287,167  11/1966  Weiss et al. ............................. 429/13

*Primary Examiner*—T. Tung
*Assistant Examiner*—H. A. Feeley
*Attorney, Agent, or Firm*—Kenyon & Kenyon, Reilly, Carr & Chapin

[57] ABSTRACT

Apparatus for controlling the electrolyte level and electrolyte concentration of fuel cell batteries, which comprises an electrolyte vessel and a tube, open on both sides and having an overflow at a distance $h$ from its lower end, with its lower end immersed in the electrolyte vessel and the reaction water depleted in the fuel cell battery supplied to its upper end, in which apparatus $h$ is selected such that $h = l \cdot \gamma_1/\gamma_0$ where $l$ is the immersion depth of the tube in the electrolyte vessel, $\gamma_1$ the density of the electrolytic liquid and $\gamma_0$ the density of the depleted reaction water.

4 Claims, 3 Drawing Figures

APPARATUS FOR CONTROLLING THE ELECTROLYTE CONCENTRATION OF FUEL CELL BATTERIES

BACKGROUND OF THE INVENTION

The invention relates to apparatus for controlling the electrolyte level and the electrolyte concentration of fuel cell batteries.

In the generation of electric energy with hydrogen-/oxygen fuel cells and batteries, water which dilutes the electrolytic liquid is produced as a reaction product. For continuous operation of such current generators, i.e., fuel cells and batteries, it is therefore necessary to remove the reaction water formed from the electrolytic liquid, i.e., to deplete the reaction water. The duration of carrying out removal of the reaction water and the quantity of the reaction water depleted are generally controlled by density or concentration measuring equipment, conductivity meters or level indicators. However, a common characteristic of all these arrangements is that they are error prone and trouble prone and that, in addition, they employ switching elements which must be actuated through a control unit which consumes energy. This, however, lowers the efficiency of the current generators.

In view of these problems, it is an object of the present invention to provide apparatus by means of which the concentration and the tank level of the electrolytic liquid of fuel cell batteries can be kept constant in a simple manner without consuming any electrical energy.

SUMMARY OF THE INVENTION

According to the invention, this problem is solved by using an electrolyte vessel and a tube, open on both sides and having an overflow at a distance $h$ from its lower end which has its lower end immersed in the electrolyte vessel and to the upper end of which the reaction water depleted in the fuel cell battery can be supplied. The dimension $h$ is selected so that $h = l \cdot \gamma_1/\gamma_o$ where $l$ is the immersion depth of the tube in the electrolyte vessel, $\gamma_1$ the density of the electrolytic liquid and $\gamma_o$ the density of the depleted reaction water.

Such apparatus affords various advantages: it requires neither sensors nor energy consuming controls and switching members of any kind; and, in addition, it has no mechanically movable parts and is therefore not trouble prone.

The tube used in the apparatus according to the present invention need not be straight; it may also be curved or bent. It is also not necessary that the tube be immersed vertically in the electrolyte vessel. However, if it is inclined, the distance $h$ as well as the immersion depth $l$ must be measured perpendicular to the liquid surface in the electrolyte vessel.

The electrolyte vessel, i.e., the vessel containing the electrolytic liquid, is arranged in the electrolyte loop of the fuel cell battery. Thus, it is preferable that the electrolyte supply tank of the fuel cell battery, i.e., the electrolyte tank be used as the electrolyte vessel.

DETAILED DESCRIPTION OF THE PREFERRED EMBODIMENT

Figure 1:
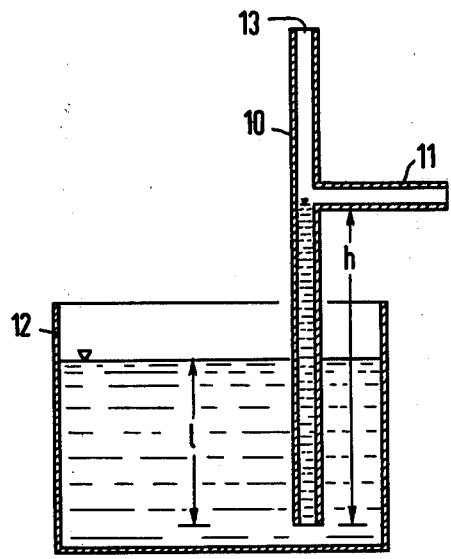
FIG. 1 is a cross sectional view of a first embodiment of the present invention using a simple overflow tube.

In the apparatus according to the present invention the hydrostatic pressure resulting from the density difference between the electrolytic liquid and the depleted reaction water is used. The control of the electrolyte level and the electrolyte concentration in the embodiment shown in FIG. 1 is accomplished as follows. A tube 10, open on both sides, is provided with an overflow in the form of a tube 11 at a distance $h$ from its lower end. This lower end is immersed in an electrolyte vessel 12 up to the height $l$. The electrolytic liquid in the electrolyte vessel 12 has a density $\gamma_1$. The depleted reaction water, which has a density $\gamma_o$, is supplied to the tube 10 through its open upper end 13.

Only the amount of reaction water formed is discharged through the overflow tube 11. This is true because the electrolyte level in the electrolyte vessel 12 would always adjust itself so that the condition $\gamma_1 \cdot l = \gamma_o \cdot h$ is fulfilled. If more water were removed than is formed by the fuel cell battery, the electrolyte level in the electrolyte vessel 12 would drop. However, this is not possible since then $l$ would become smaller and water would therefore flow immediately from the tube 10 into the electrolyte vessel 12 until the condition described above is again fulfilled. The same product $\gamma_1 \cdot l$ therefore always adjusts itself; i.e., for constant temperature, the same electrolyte density and the same electrolyte level are present and only the amount of reaction water formed is discharged through the overflow tube 11. Thus, if KOH is used as the electrolytic liquid, the density remains constant at 1.220 g/cm$^3$ within the reading accuracy of the hydrometer of about 0.005 g/cm$^3$.

EXAMPLE

In a device constructed in accordance with the present invention the transition point between transporting the reaction water to the outside and transporting it into the electrolyte vessel corresponded, for instance, to a production or depletion of 130 ml of water for an electrolyte volume of about 13 l. The level in an electrolyte vessel with a liquid surface of 420 cm$^2$ changed by 3mm in the process. The tube 10 had an overall length of 32 cm and the distance $h$ of the overflow tube 11 from the tube end was 30 cm. The tube 10 had an inside diameter of abou. 8mm and and the overflow tube 11 an inside diameter of about 6mm.

The results above show clearly that the control by means of the apparatus according to the invention is very sensitive. Through suitable design of the overflow, the sensitivity can be even increased still further. This can be achieved, for instance, through the use of suitable materials, particularly through the use of highly wettable materials. However, it is also possible to improve sensitivity by proper shaping of the parts. Thus, the overflow 11 may, for instance, have a flattened shape, i.e., not a circular but a more rectangular cross section. The overflow 11 may also be a runoff channel with a trough-like cross section.

Figure 2:
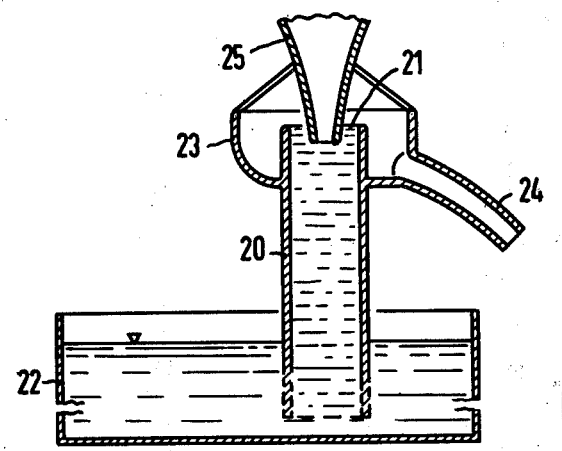
FIG. 2 is a similar view of a second embodiment utilizing an overflow tray.

In the embodiment of the apparatus of the present invention shown in FIG. 2, the possibility of overflow to all sides is provided. For this purpose, a tube 20 immersed in an electrolyte vessel 22 is surrounded by an overflow tray 23 provided with a runoff 24. Overflow occurs at the height of the upper opening 21, which is the overflow opening, the overflow being collected by the tray 23 and then running off through runoff 24. In this embodiment, the reaction water is fed to the tube 20 through an inlet 25 which is attached at the overflow tray 23 in a suitable manner. This can be accomplished, for instance, through the use of a closed overflow tray. This embodiment, which permits overflow to all sides, has the advantage that it has good sensitivity even at an angle, i.e., when the tube 20 is disposed in the vessel 22 in inclined position.

Figure 3:
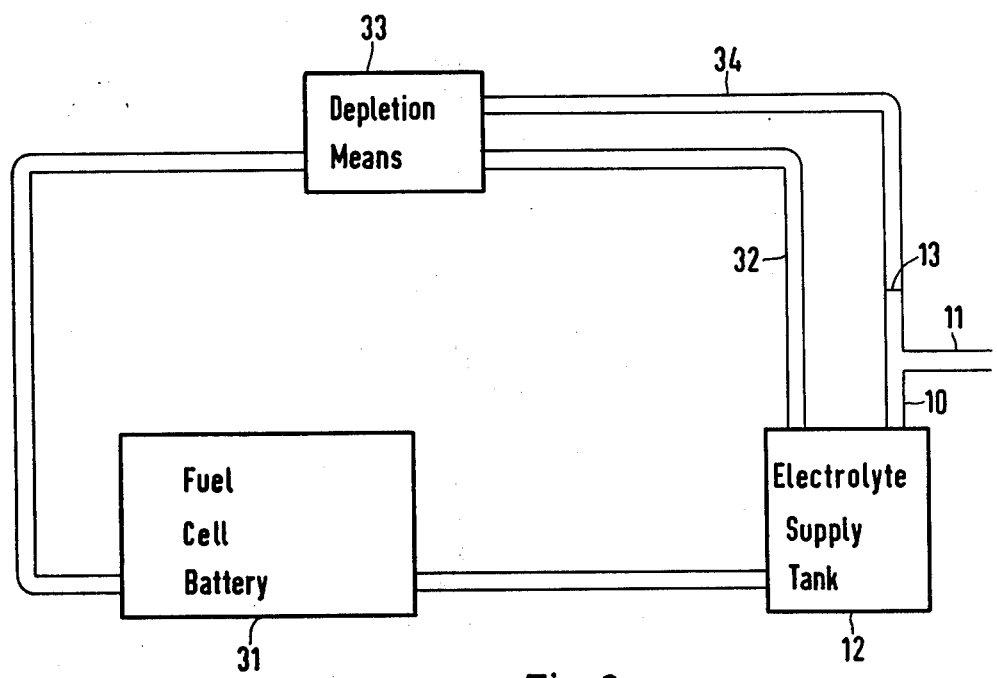
FIG. 3 is a block diagram of the present invention used with a fuel cell battery.

FIG. 3 illustrates in block diagram form the use of the apparatus of the present invention with a fuel cell battery. The electrolyte vessel 12 is the electrolyte supply tank for the fuel cell battery 31 arranged in the electrolyte loop 32. Depletion means 33 such as disclosed in U.S. Pat. No. 3,629,075 are coupled to the battery 31 for removing reaction water. The removed reaction water is supplied via line 34 to the open end 13 of the tube 10 as described above.

I claim:

1. Apparatus for controlling the electrolyte level and electrolyte concentration of a fuel cell battery, comprising:
   a. an electrolyte vessel in the electrolyte loop of the fuel cell battery; and
   b. a tube, open on both sides, immersed in the electrolyte vessel with its upper end available for coupling to the reaction water depleted in the fuel cell battery, said tube having an overflow at a distance $h$ from the lower end of said tube where $h$ is selected such that $h = l \cdot \gamma_1/\gamma_o$ where $l$ is the immersion depth of said tube in said electrolyte vessel, $\gamma_1$ is the density of the electrolytic liquid and $\gamma_o$ is the density of the depleted reaction water, said overflow being above the level of the electrolyte in said electrolyte vessel.

2. Apparatus according to claim 1, wherein at the height of said overflow, said tube is surrounded by an overflow tray provided with a runoff.

3. Apparatus according to claim 2 wherein said electrolyte vessel is the electrolyte supply tank of the fuel cell battery.

4. Apparatus according to claim 1 wherein said electrolyte vessel is the electrolyte supply tank of the fuel cell battery.

* * * * *